United States Patent [19]
Opprecht

[11] 3,842,235
[45] Oct. 15, 1974

[54] METHOD OF ELECTRIC SEAM RESISTANCE WELDING

[76] Inventor: Paul Opprecht, im hinteren Bernold, 8953 Bergdietikon, Switzerland

[22] Filed: Dec. 14, 1972

[21] Appl. No.: 315,007

[30] Foreign Application Priority Data
Feb. 18, 1972  Switzerland.......................... 2387/72

[52] U.S. Cl...................... 219/83, 219/84, 219/119
[51] Int. Cl............................................. B23k 11/06
[58] Field of Search............ 219/80, 81, 82, 83, 84, 219/119, 120

[56] References Cited
UNITED STATES PATENTS

| | | |
|---|---|---|
| 1,300,603 | 4/1919 | Gravell .............................. 219/83 X |
| 1,308,778 | 7/1919 | Gravell .............................. 219/83 |
| 2,437,740 | 3/1948 | Haynes .............................. 219/120 |
| 3,102,945 | 9/1963 | Opprecht ............................ 219/81 |
| 3,430,027 | 2/1969 | Denis.................................. 219/81 |
| 3,504,155 | 3/1970 | Opprecht et al...................... 219/81 |
| 3,596,043 | 7/1971 | Sporri .............................. 219/84 X |

Primary Examiner—Thomas J. Kozma
Attorney, Agent, or Firm—Browdy and Neimark

[57] ABSTRACT

Electric seam welding utilizing a single-wire electrode and two electrode support rolls wherein the wire is a hard wire having a cross-section resembling a sector and having straight or convex flanks.

26 Claims, 5 Drawing Figures

METHOD OF ELECTRIC SEAM RESISTANCE WELDING

The present invention concerns a method of electric seam resistance welding by means of a single-wire electrode and two electrode support rolls.

In electric seam resistance welding using a single-wire electrode guided by two electrode support rolls, it is a known fact that during the welding process, in which the single-wire electrode is exposed to increased temperatures at the welding point, the said wire undergoes lengthening and corresponding reduction in cross-section. This results in the formation of a loop between the two electrode support rolls. Actually, when the wire moving away from the first roll passes on to the second roll, it should have the same speed as when running into the first roll. However, the said lengthening of the wire under the electrode rolls causes a corresponding loop to form between the two rolls. There are known means designed to take up the slack during the welding pauses. In so-called ABM (automatic body maker) machines, however, such taking-up of the slack is not possible.

The object of the invention claimed hereunder is to prevent looping by the use of a hard wire whose cross-section resembles a sector and which has straight or convex flanks. Under rolling, the cross-section may be reduced to 60 – 75 percent of the orginal wire cross-section.

To prevent looping, it is necessary, according to the strength properties of the wire, to draw or roll the wire before it runs on to the first electrode roll for the purpose of substantially increasing its strength or hardness so that it cannot undergo further deformation under the subsequent welding pressure of the electrode support rolls and at the welding temperature applied, Undersirable lengthening of the wire under the electrode support rolls and, accordingly, looping can be prevented by suitable pre-rolling and also by suitable selection of the welding pressure and, further, by good cooling of the rolls and the wire in the zone of the welding point.

The present invention leaves it open to choice whether to draw or roll the electrode wire immediately before running into the first electrode support roll, or whether to use correspondingly harder wire which has already been processed at the works to the desirable strength values, in particular the desirable elastic limit.

The invention is now to be described by way of example with reference to the accompanying drawings, in which.

Figure 1:
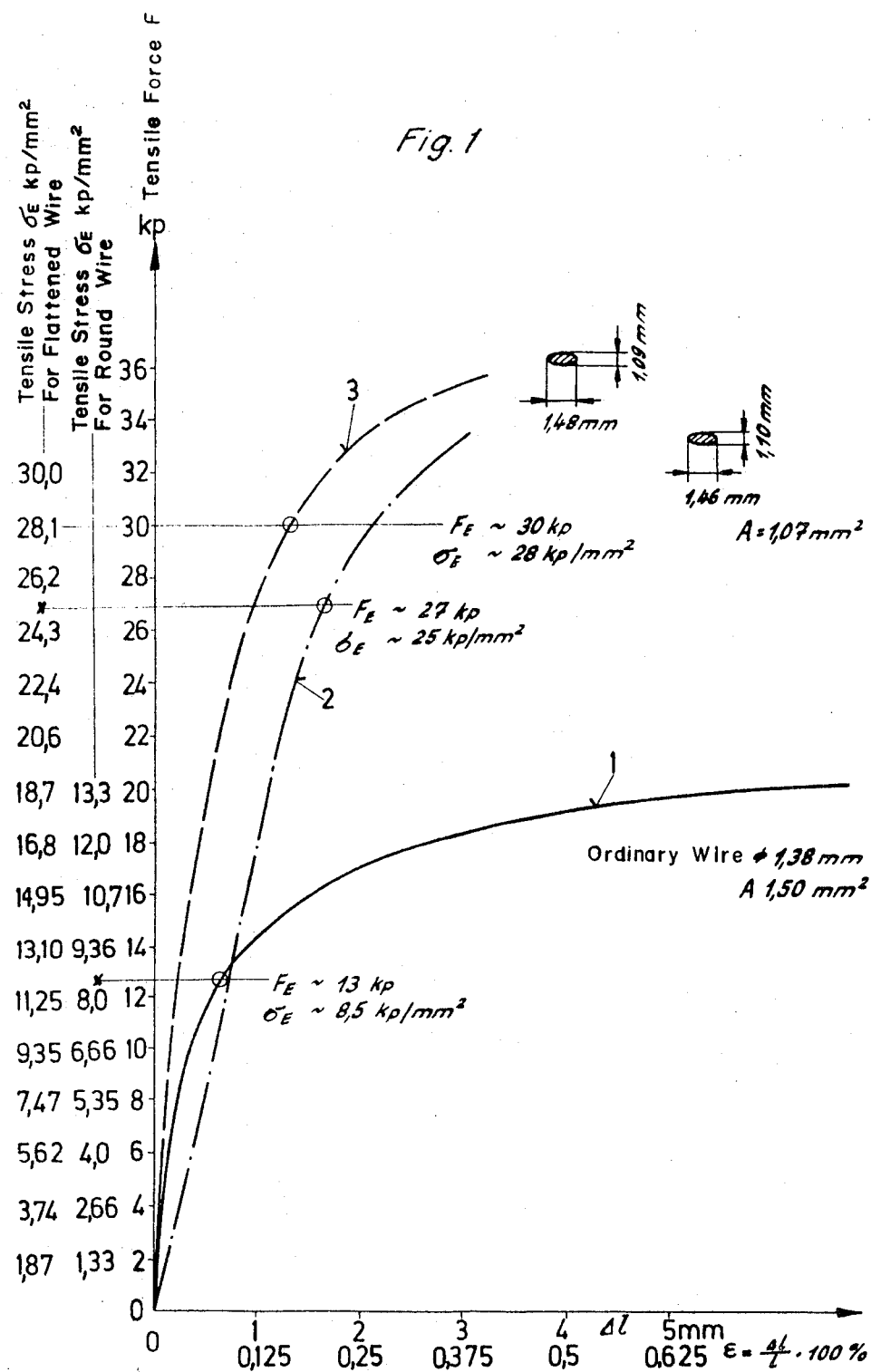
FIG. 1 shows a stress-strain diagram.

The stress-strain diagram shown in FIG. 1 presents a curve 1 for a copper wire of 1.38 mm diameter and with an elastic limit tensile stress $\sigma_E$ of 8.5 kp/mm². Curve 2 shows the round wire according to curve 1 after flattening to a cross-section of about 1.46 mm × 1.10 mm (greatest width by greatest height), with an elastic limit tensile stress $\sigma_E$ of approximately 25 kp/mm².

Curve 3 indicates yet a further slight increase in strength, in that flattening to a cross-section of 1.48 mm × 1.09 mm has raised the elastic limit tensile stress $\sigma_E$ to approximately 28 kp/mm².

As the diagram reveals, the elastic limit of the flattened and therefore harder and more tensile-resistant wire (curves 2 and 3) is approximately three times higher. Thus, if a roll pressure of 12 kp/mm² is applied in welding, the wire according to curve 1 will undergo permanent deformation. The result is a loop. The drawn or rolled wires (curves 2 and 3), however, being deformed within their elastic range, return to their original form and therefore do not form a loop.

For reasons of welding technology and because of the deformation, the welding electrode should rest on the work with as large a surface as possible, as this results in a correspondingly lower pressure per unit area and therefore requires less severe pre-drawing.

The precaution of hardening the wire by rolling, as described, also accommodates the ever higher welding speeds being applied. Higher welding speeds call for higher current, as the contact time at the welding point diminishes proportionally with speed. But as the total current energy applied to a particular weld, viz.

$$\int_{t_0}^{t_1} R \cdot i^2 \, dt,$$

must be constant (R = resistance, $i$ = current, $t$ = time), it is obvious that with resistance R constant the current $i$ must vary as the root of the welding speeds, meaning in the present case that it must increase.

For such a higher current to act without sparking, it is necessary to apply a higher welding pressure, and this reduces the resistance R and therefore involves a further increase in the current i, which rises proportionally to the root of the welding pressure relation.

With welding pressure increasing, it is necessary, for reasons of mechanical stability, to give greater dimensions to the particular components, notably the welding arms, so that for this reason again the surface with which the electrode wires rest on the work should be as large as possible. This precaution concurrently reduces the notch effect, which largely makes it impossible to flange the welds because of tearing.

Figure 2:
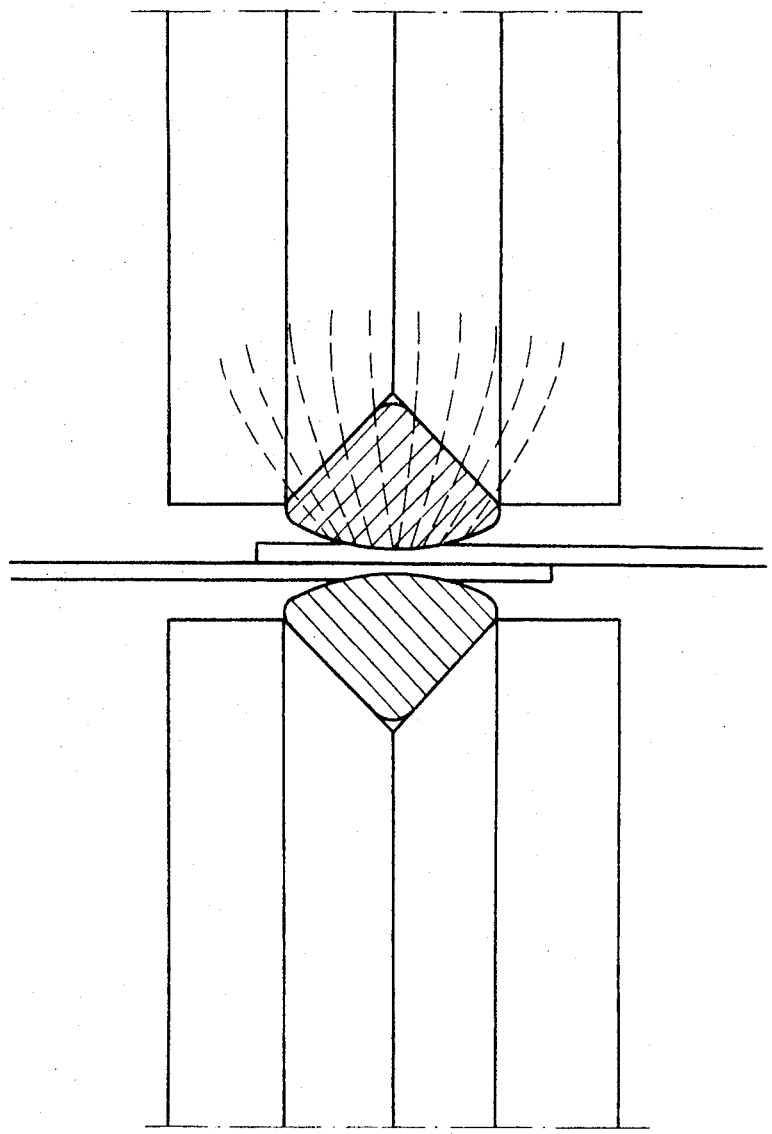
FIG. 2 shows a diagram of two electrode rolls with the work and the electrode wire, cut away in the welding zone, with ellipse-sectoral wire cross-section.

Extensive tests have shown that a wire cross-section according to FIGS. 2 – 5 with suitable grooves in the two electrode rolls, whose axes are dash-dotted in FIG. 2, for receiving the electrode wire produces excellent results. The sector angle of the circle-sectoral cross-section (FIG. 2) is preferably in the neighborhood of 90°, while the radius of curvature at the apex of the elliptical contour line is of the order 2 to 4 mm. The copper wire itself has a cross-sectional area of preferably 1.5 to 3 mm².

When a round wire is flattened or drawn, its cross-section is reduced to 60 – 75 percent of the original round cross-section; thus, a round wire of 1.38 mm diameter should, after flattening, preferably present a sectoral area of 1.0 mm², for instance. In this, the flattening proceeds in the direction of the current path.

Figure 3:
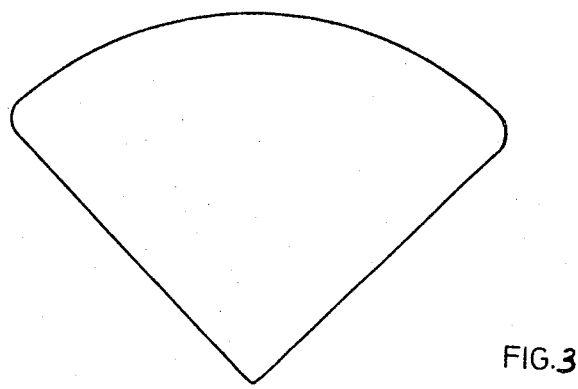
FIG. 3 shows a circle-sectoral wire cross-section.
Figure 4:
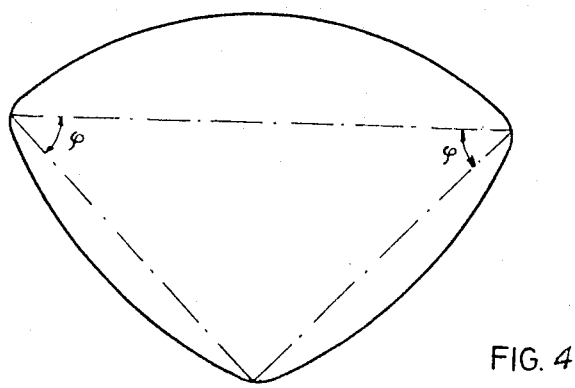
FIG. 4 shows a wire cross-section similar to an ellipse sector, with convex flanks.
Figure 5:
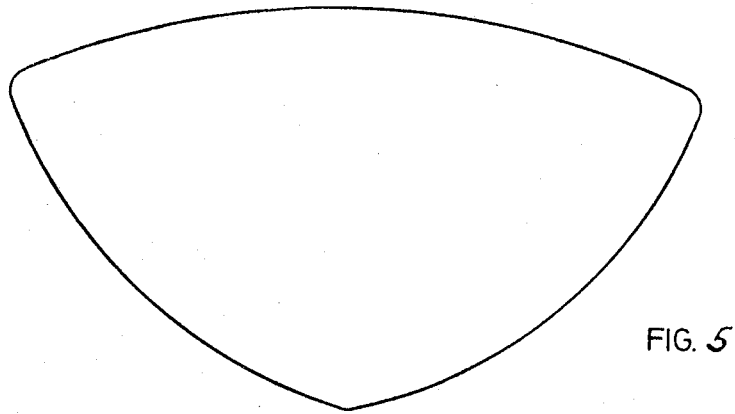
FIG. 5 shows a wire cross-section similar to a lens sector, with convex flanks.

FIGS. 3 – 5 show other sectoral wire cross-sections with a circular or lenticular back-line and straight or convex flanks.

It is possible to re-shape a round wire in a roll profiler in the welding machine directly into a wire of sectoral cross-section and draw it.

Wires of ellipse-sectoral cross-section have so far produced very good and consistent results in welding. The contact area between wire and roll is about 40 percent larger than with the round wire. This has the desired effects of lower specific current load and also lower heat-up of wire and roll. The wire no longer undergoes annealing and straining. The lateral guidance of the wire in the roll and, accordingly, on the work is better, without any lateral straying of the wire. The better guidance of the wire in the groove of the roll practically rules out any lateral twist of the welding contact surface, which may be ellipsoidal, for instance, which twist results in faulty welds. The wedge action of the wire increases the contact pressure between roll and wire in the flanks of the groove. This again reduces heat-up and improves the current flow, as desired. If the flanks of the wire cross-section are straight, re-profiling of the conical side flanks of the electrode rolls will be especially easy.

The short current path from the groove of the roll across the wire to the welding point also tends to reduce wire heat-up. These advantages are noticeable in particular in welding machines with increased electric capacities and throughputs of over 15 meters/min, for instance. When the wire cross-section has convex flanks, as in FIGS. 4 and 5, for instance, it is preferably to make all three sides equally long, so that the angle phi is 60°(3 × 60°), as it is then possible by turning the wire through 120° at a time to use all three sides as welding lines, so that both sides of the weld come into contact with a tin-free wire surface.

Under the present invention, it is now possible to work with a lower welding pressure or increase the welding speed further, and, with the wire pre-rolled, there is no risk of stretching and consequent looping. This ensures fully controlled wire guidance, which is important at the point where the single-wire electrode runs on to the second electrode guide roll, because of the soiled surface. The lower welding pressures also permit a lighter construction of the welding machine.

The welding process is improved by the described prerolling alone, for this not only prevents looping, but also improves wire guidance, reduces the load on the construction, improves current flow and permits the welds to be more easily flanged.

It is thus possible to work continuously with an automatic machine by means of a single electrode wire successively running through the two electrode support rolls, without any need for lifting the upper roll head to pull along the slack of the wire.

I claim:

1. In a method of electric seam resistance welding by means of a single-wire electrode in contact with two electrode support rolls, the improvement wherein the wire electrode is prehardened by drawing or rolling the wire, before said wire runs onto the first electrode support roll, to an extent such that substantially no further permanent deformation occurs under the subsequent welding pressure of the electrode support rolls and at the welding temperature applied, and wherein said wire has a cross section in the shape of a sector having straight or convex flanks.

2. A method according to claim 1, wherein the cross-section of said electrode wire presents a back-line which is an arc of an ellipse.

3. A method according to claim 1 wherein said drawing or rolling is performed immediately before running into the first electrode support roll.

4. A method in accordance with claim 1 wherein the cross-section of said electrode wire presents a back-line which is an arc of a lens.

5. A method in accordance with claim 1 wherein the cross-section of said electrode wire presents a back-line which is an arc of a circle.

6. A method in accordance with claim 1 wherein said pre-hardening is accomplished by working a conventional round electrode wire into the desired cross-section and reducing the final cross-sectional area of the wire to 60 –75 percent of the original cross-sectional area of the round wire.

7. In a method of electric seam resistance welding by means of a single-wire electrode in contact with two electrode support rolls, the improvement wherein the wire electrode is pre-hardened, before said wire runs onto the first electrode support roll, by working a conventional round electrode wire until the final cross-sectional area of the wire is reduced to an extent such that substantially no further permanent deformation occurs under the subsequent welding pressure of the eectrode support rolls and at the welding temperature applied.

8. A method in accordance with claim 7 wherein said working results in a wire having a cross-section in the shape of a sector having straight or convex flanks.

9. In an apparatus for electric seam resistance welding by means of a single-wire electrode in contact with two electrode support rolls, the improvement wherein the wire electrode is pre-hardened, before said wire runs onto the first electrode support roll, by working a conventional round electrode wire until the final cross-sectional area of the wire is reduced to an extent such that substantially no further permanent deformation occurs under the subsequent welding pressure of the electrode support rolls and at the welding temperature applied.

10. An apparatus in accordance with claim 9 further including working means, immediately before the first electrode support roll, for working a conventional round electrode wire until the final cross-sectional area of the wire is reduced to an extent such that substantially no further permanent deformation occurs under the subsequent welding pressure of the electrode support rolls and at the welding temperature applied.

11. A method in accordance with claim 1 wherein each of the angles phi of the sector is 60°.

12. A method according to claim 8 wherein the cross-section of said electrode wire presents a back-line which is an arc of an ellipse.

13. A method in accordance with claim 8 wherein the cross-section of said electrode wire presents a back-line which is an arc of a lens.

14. A method in accordance with claim 8 wherein the cross-section of said electrode wire presents a back-line which is in arc of a circle.

15. A method in accordance with claim 8 wherein each of the angles phi of the sector is 60°.

16. A method in accordance with claim 11 wherein said flanks are convex.

17. A method in accordance with claim 15 wherein said flanks are convex.

18. An apparatus in accordance with claim 9 wherein the wire has a final cross-section resembling the shape of a sector having straight or convex sides.

19. An apparatus in accordance with claim 18 wherein the cross-section of said electrode wire presents a back-line which is an arc of an ellipse.

20. An apparatus in accordance with claim 18 wherein the cross-section of said electrode wire presents a back-line which is an arc of a lens.

21. An apparatus in accordance with claim 18 wherein the cross-section of said electrode wire presents a back-Line which is an arc of a circle.

22. An apparatus in accordance with claim 18 wherein each of the angles phi of the sector is 60°.

23. An apparatus in accordance with claim 22 wherein said flanks are convex.

24. A method in accordance with claim 7, wherein said wire is reduced to 60 –75 percent of the original cross-sectional area of the round wire.

25. An apparatus in accordance with claim 9, wherein said wire is reduced to 60–75 percent of the original cross-sectional area of the round wire.

26. An apparatus in accordance with claim 10, wherein said working means reduces the final cross-sectional area of the wire to 60–75 percent of the original cross-sectional area of the round wire.

* * * * *

REEXAMINATION CERTIFICATE (1171st)
United States Patent [19]
Opprecht

[11] B1 3,842,235
[45] Certificate Issued  Dec. 19, 1989

[54] METHOD OF ELECTRIC SEAM RESISTANCE WELDING

[75] Inventor: Paul Opprecht, Bergdietikon, Switzerland

[73] Assignee: Elpatronic AG, Zug, Switzerland

Reexamination Request:
No. 90/001,056, Jul. 15, 1986

Reexamination Certificate for:
Patent No.: 3,842,235
Issued: Oct. 15, 1974
Appl. No.: 315,007
Filed: Dec. 14, 1972

[51] Int. Cl.⁴ ............................................. B23K 11/06
[52] U.S. Cl. ....................................... 219/83; 219/84; 219/119
[58] Field of Search ................. 219/81, 82, 83, 84, 219/119, 120

[56] References Cited

U.S. PATENT DOCUMENTS

| | | | |
|---|---|---|---|
| 1,300,603 | 4/1919 | Gravell | 219/83 X |
| 1,308,778 | 7/1919 | Gravell | 219/83 |
| 2,437,740 | 3/1948 | Haynes | 219/120 |
| 3,102,945 | 9/1963 | Opprecht | 219/81 |
| 3,430,027 | 2/1969 | Denis | 219/81 |
| 3,504,155 | 3/1970 | Opprecht et al. | 219/81 |
| 3,596,043 | 7/1971 | Sporri | 219/84 X |
| 4,068,156 | 1/1978 | Johnson et al. | 364/478 X |
| 4,308,584 | 12/1981 | Arai | 364/513 |
| 4,396,987 | 8/1983 | Inaba et al. | 364/513 |
| 4,467,436 | 8/1984 | Chance et al. | 364/513 |
| 4,543,639 | 9/1985 | Inaba et al. | 364/513 |
| 4,547,858 | 10/1985 | Horak | 364/513 |
| 4,549,276 | 10/1985 | Inaba et al. | 354/513 |
| 4,598,380 | 7/1986 | Holmes et al. | 364/513 |
| 4,623,971 | 11/1986 | Ailman et al. | 364/513 |

FOREIGN PATENT DOCUMENTS

2102783  8/1971  Fed. Rep. of Germany .
2126497  10/1972  Fed. Rep. of Germany .
2130678  11/1972  France .

OTHER PUBLICATIONS

Van Vlack, L. H., *Elements of Materials Science*, 2nd ed., Reading, Massachusetts: Addison–Wesley Publishing Co., 1964, pp. 148–153.

*Primary Examiner*—Clifford C. Shaw

[57] ABSTRACT

Electric seam welding utilizing a single-wire electrode and two electrode support rolls wherein the wire is a hard wire having a cross-section resembling a sector and having straight or convex flanks.

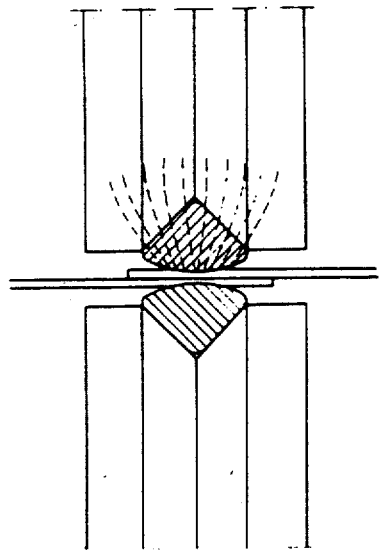

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-6, 8, and 11-23 is confirmed.

Claims 7, 9, 10, and 24-26 are cancelled.

* * * * *